United States Patent
Hatakeyama et al.

(10) Patent No.: US 10,363,555 B2
(45) Date of Patent: *Jul. 30, 2019

(54) POLYMER COMPOUND FOR CONDUCTIVE POLYMER AND METHOD FOR PRODUCING THE SAME

(71) Applicant: SHIN-ETSU CHEMICAL CO., LTD., Tokyo (JP)

(72) Inventors: Jun Hatakeyama, Jyoetsu (JP); Koji Hasegawa, Jyoetsu (JP); Masaki Ohashi, Jyoetsu (JP); Masayoshi Sagehashi, Jyoetsu (JP); Takayuki Nagasawa, Jyoetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 48 days.

This patent is subject to a terminal disclaimer.

(21) Appl. No.: 14/816,465

(22) Filed: Aug. 3, 2015

(65) Prior Publication Data
US 2016/0067702 A1 Mar. 10, 2016

(30) Foreign Application Priority Data
Sep. 5, 2014 (JP) ................................. 2014-181467

(51) Int. Cl.
*B01J 39/20* (2006.01)
*H01M 8/1023* (2016.01)
*H01M 8/1039* (2016.01)
*H01M 8/1018* (2016.01)

(52) U.S. Cl.
CPC ........... *B01J 39/20* (2013.01); *H01M 8/1023* (2013.01); *H01M 8/1039* (2013.01); *H01M 2008/1095* (2013.01); *H01M 2300/0082* (2013.01); *Y02P 70/56* (2015.11)

(58) Field of Classification Search
CPC ..... H01M 8/1039; H01M 8/1023; B01J 39/20
See application file for complete search history.

(56) References Cited

U.S. PATENT DOCUMENTS

| | | | | |
|---|---|---|---|---|
| 6,136,499 | A * | 10/2000 | Goodall | C08G 61/08 430/270.1 |
| 10,020,089 | B2 * | 7/2018 | Hatakeyama | H01B 1/127 |
| 2011/0159429 | A1 * | 6/2011 | Thackeray | C08F 220/38 430/270.1 |
| 2011/0183263 | A1 | 7/2011 | Takahashi et al. | |
| 2013/0040096 | A1 * | 2/2013 | Iwato | G03F 7/0045 428/98 |

FOREIGN PATENT DOCUMENTS

| JP | 2008-146913 | * | 6/2008 |
|---|---|---|---|
| JP | 2008-146913 A | | 6/2008 |
| JP | 2010-197618 A | | 9/2010 |
| JP | 2010-209277 | * | 9/2010 |
| JP | 2011-175253 A | | 9/2011 |

OTHER PUBLICATIONS

Sep. 12, 2017 Office Action issued in Japanese Application No. 2014-181467.
Jun. 13, 2017 Office Action issued in Japanese Application No. 2014-181467.

* cited by examiner

*Primary Examiner* — Peter D. Mulcahy
(74) *Attorney, Agent, or Firm* — Oliff PLC

(57) ABSTRACT

The present invention provides a polymer compound for a conductive polymer, having one or more kinds of repeating units "a" represented by the following general formula (1), the polymer compound for a conductive polymer being synthesized by ion exchange of a lithium salt, a sodium salt, a potassium salt, a sulfonium compound salt, or a nitrogen compound salt of sulfonic acid residue with a weight average molecular weight in the range of 1,000 to 500,000,

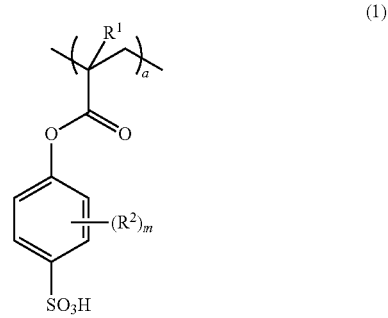

(1)

wherein $R^1$ represents a hydrogen atom or a methyl group, $R^2$ represents a fluorine atom or a trifluoromethyl group, "m" represents an integer of 1 to 4, and "a" satisfies $0<a\leq1.0$. There can be provided a polymer compound for a conductive polymer having a specific superacidic sulfo group that is soluble in an organic solvent and suitably used for fuel cells or a dopant for conductive materials.

5 Claims, No Drawings

POLYMER COMPOUND FOR CONDUCTIVE POLYMER AND METHOD FOR PRODUCING THE SAME

BACKGROUND OF THE INVENTION

Field of the Invention

The present invention relates to a polymer compound for a conductive polymer and a method for producing the same.

Description of the Related Art

A sulfo group-containing polymer is used as a fuel cell or a dopant polymer for a conductive polymer. Vinyl perfluoroalkyl ether sulfonic acid typified by Nafion (registered trademark) has been used as a material for a fuel cell, and a polymer of vinyl sulfonic acid or styrene sulfonic acid has been widely used as a dopant polymer for a conductive polymer (Patent Document 1).

Vinyl perfluoroalkyl ether sulfonic acid has high chemical stability and excellent durability, but low glass transition point. Therefore, when a fuel cell using vinyl perfluoroalkyl ether sulfonic acid is exposed to high temperature, the polymer causes thermal flow whereby ionic conductivity thereof is decreased. A superacidic polymer having a fluorinated sulfo group at the α-position is effective for an increase in ionic conductivity. However, a material having high glass transition point and high chemical stability with such a structure has not been found.

A conductive polymer having a conjugated double bond, such as polythiophene, polyaniline, and polypyrrole, does not exhibit conductivity itself. However, by doping strong acid such as sulfonic acid, the polymer exhibits conductivity. As a dopant, polystyrenesulfonic acid (PSS) is most widely used. This is because doping PSS achieves the highest conductivity.

PSS is a water-soluble resin, and is hardly dissolved in an organic solvent. Accordingly, polythiophene in which PSS is doped is also water soluble.

Since polythiophene in which PSS is doped is highly conductive and highly transparent, the polythiophene is expected as a conductive film for organic EL illumination instead of indium-tin oxide (ITO). However, a light-emitting body of organic EL causes chemical changes due to moisture and ceases to emit light. Accordingly, use of a conductive film made of a water-soluble resin for an organic EL causes a problem in which the emission lifetime of the organic EL shortens. This is because the resin contains water.

PRIOR ART DOCUMENT

Patent Document

Patent Document 1: Japanese Patent Laid-Open Publication No. 2008-146913

SUMMARY OF THE INVENTION

The present invention was made in view of the above situation, and has an object to provide a polymer compound for a conductive polymer having a specific superacidic sulfo group that is soluble in an organic solvent and suitably used for fuel cells or a dopant for conductive materials. Another object is to provide a method for producing such a polymer compound for a conductive polymer.

In order to solve the problem, the present invention provides a polymer compound for a conductive polymer, having one or more kinds of repeating units "a" represented by the following general formula (1), the polymer compound for a conductive polymer being synthesized by ion exchange of a lithium salt, a sodium salt, a potassium salt, a sulfonium compound salt, or a nitrogen compound salt of sulfonic acid residue with a weight average molecular weight in the range of 1,000 to 500,000,

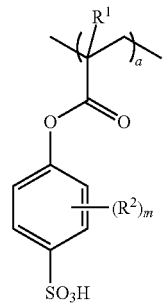

(1)

wherein $R^1$ represents a hydrogen atom or a methyl group, $R^2$ represents a fluorine atom or a trifluoromethyl group, "m" represents an integer of 1 to 4, and "a" satisfies $0<a\leq1.0$.

Such a polymer compound for a conductive polymer is a polymer compound for a conductive polymer having a specific superacidic sulfo group that is soluble in an organic solvent and suitably used for fuel cells or a dopant for conductive materials.

It is preferable that the polymer compound for a conductive polymer further have a repeating unit "b" represented by the following general formula (2),

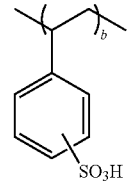

(2)

wherein "b" satisfies $0<b<1.0$.

When the repeating unit "a" is copolymerized with the repeating unit "b" of polystyrenesulfonic acid, the polymer compound can be used as a highly conductive dopant polymer.

It is preferable that the lithium salt, the sodium salt, the potassium salt, the sulfonium compound salt, or the nitrogen compound salt of the sulfonic acid residue is composed of a repeating unit represented by the following general formula (3),

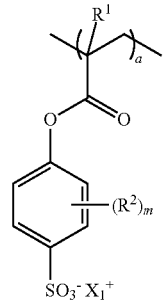

(3)

wherein $R^1$, $R^2$, "m", and "a" represent the same meanings as before, and $X_1$ represents lithium, sodium, potassium, a sulfonium compound, or a nitrogen compound represented by the following general formula (4),

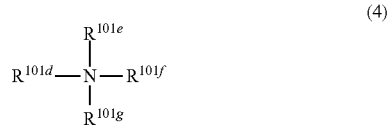

(4)

wherein each of $R^{101d}$, $R^{101e}$, $R^{101f}$, and $R^{101g}$ represents a hydrogen atom, a linear, branched, or cyclic alkyl group, alkenyl group, oxoalkyl group, or oxoalkenyl group having 1 to 12 carbon atoms, an aryl group having 6 to 20 carbon atoms, or an aralkyl group or aryloxoalkyl group having 7 to 12 carbon atoms, in which a part of or all of the hydrogen atoms may be substituted by alkoxy groups, $R^{101d}$ and $R^{101e}$, or $R^{101d}$, $R^{110e}$, and $R^{101f}$ may bond to form a ring, and if they form a ring, $R^{101d}$ and $R^{101e}$, or $R^{101d}$, $R^{101e}$, and $R^{101f}$ represent an alkylene group having 3 to 10 carbon atoms or an aromatic heterocyclic ring having therein the nitrogen atom in the formula.

This repeating unit can be easily converted into the repeating unit "a" represented by the general formula (1) by ion exchange.

Further, the present invention provides a method for producing a polymer compound for a conductive polymer having a repeating unit "a" represented by the following general formula (1), in which a polymerization reaction is carried out using a monomer having a structure of salt of a sulfonic acid residue and lithium, sodium, potassium, a sulfonium compound, or a nitrogen compound, and after the polymerization reaction, converting the structure of salt of the sulfonic acid residue and the lithium, the sodium, the potassium, the sulfonium compound, or the nitrogen compound into a sulfo group by ion exchange,

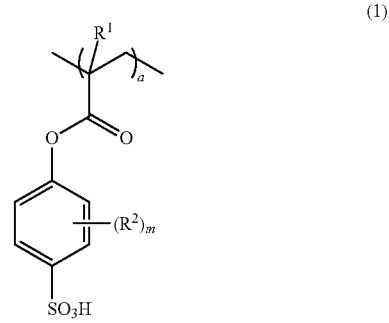

(1)

wherein $R^1$ represents a hydrogen atom or a methyl group, $R^2$ represents a fluorine atom or a trifluoromethyl group, "m" represents an integer of 1 to 4, and "a" satisfies $0<a\leq1.0$.

According to the method, a polymer compound for a conductive polymer having a repeating unit "a" represented by the general formula (1) can be easily produced.

As described above, the polymer compound for a conductive polymer of the present invention is a polymer compound for a conductive polymer having a specific superacidic sulfo group that is soluble in an organic solvent and suitably used for fuel cells or a dopant for conductive materials.

When such a polymer compound for a conductive polymer is used for fuel cells, a highly dielectric material for fuel cells can be formed. When such a polymer compound for a conductive polymer is used as a dopant for a conjugated double bond polymer, a highly transparent, highly conductive, and highly durable conductive film can be formed. Since, the polymer compound for a conductive polymer of the present invention has a superacidic sulfonic acid bonded to a fluorinated aromatic group, the polymer compound exhibits high performance as a dopant due to the strong ionic bond, and exhibits high stability as an ion. Therefore, when the polymer compound is used for a conductive material, the conductive material has high conductivity and high stability. Since the polymer compound has excellent solubility in an organic solvent, using the polymer compound as a conductive film for an organic EL illumination can prevent deterioration of an organic EL device.

According to the producing method of the present invention, such a polymer compound for a conductive polymer of the present invention can be easily produced.

DETAILED DESCRIPTION OF THE PREFERRED EMBODIMENTS

As described above, a polymer compound for a conductive polymer having a specific superacidic sulfo group that is soluble in an organic solvent and suitably used for fuel cells or a dopant for conductive materials is required.

In order to prevent deterioration of an organic EL device by converting a water-soluble conductive polymer containing water to result in deterioration of the organic EL device into an organic solvent-soluble conductive polymer having extremely little water, inventors of the present invention have attempted to develop a polymer for a dopant having high solubility in an organic solvent from polystyrenesulfonic acid that is a dopant water-soluble and poorly soluble in an organic solvent. They have investigated the introduction of fluorine. This is because the introduction of long chain alkyl group or fluorine is effective in increasing the solubility in an organic solvent. They have found that a polymer compound having a repeating unit having a sulfo group bonded to a fluorinated aromatic group can achieve the object. Thus, the present invention has been accomplished.

Specifically, the present invention is a polymer compound for a conductive polymer, having one or more kinds of repeating units "a" represented by the following general formula (1), the polymer compound for a conductive polymer being synthesized by ion exchange of a lithium salt, a sodium salt, a potassium salt, a sulfonium compound salt, or a nitrogen compound salt of sulfonic acid residue with a weight average molecular weight in the range of 1,000 to 500,000,

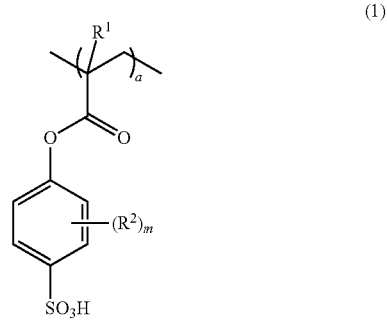

(1)

wherein $R^1$ represents a hydrogen atom or a methyl group, $R^2$ represents a fluorine atom or a trifluoromethyl group, "m" represents an integer of 1 to 4, and "a" satisfies $0<a\leq1.0$.

Hereinafter, the present invention will be described in detail, but the present invention is not limited to these.

The polymer compound for a conductive polymer of the present invention is a polymer having one or more kinds of repeating units "a" represented by the following general formula (1). The polymer compound for a conductive polymer of the present invention has particularly high transparency since one or more kinds of repeating units "a" represented by the general formula (1) are contained,

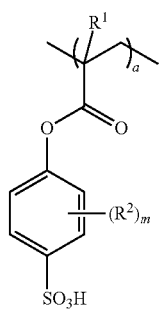
(1)

wherein $R^1$ represents a hydrogen atom or a methyl group, $R^2$ represents a fluorine atom or a trifluoromethyl group, "m" represents an integer of 1 to 4, and "a" satisfies $0<a\leq1.0$.

In the general formula (1), $R^1$ represents a hydrogen atom or a methyl group, $R^2$ represents a fluorine atom or a trifluoromethyl group, "m" represents an integer of 1 to 4, and "a" satisfies $0<a\leq1.0$, preferably $0.2\leq a\leq1.0$.

It is preferable that the polymer compound for a conductive polymer of the present invention further have a repeating unit "b" represented by the following general formula (2). When the repeating unit "a" is copolymerized with the repeating unit "b" of polystyrenesulfonic acid, the polymer compound can be used as a dopant polymer with high conductivity.

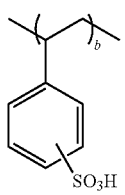
(2)

wherein "b" satisfies $0<b<1.0$.

As described below, the polymer compound for a conductive polymer of the present invention may have a repeating unit "c" other than the repeating units "a" and "b".

The polymer compound for a conductive polymer of the present invention is synthesized by ion exchange of a lithium salt, a sodium salt, a potassium salt, a sulfonium compound salt, or a nitrogen compound salt of sulfonic acid residue.

It is preferable that the lithium salt, the sodium salt, the potassium salt, the sulfonium compound salt, or the nitrogen compound salt of the sulfonic acid residue be composed of a repeating unit represented by the following general formula (3),

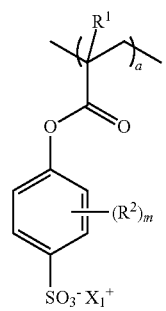
(3)

wherein $R^1$, $R^2$, "m", and "a" represent the same meanings as before, and $X_1$ represents lithium, sodium, potassium, a sulfonium compound, or a nitrogen compound represented by the following general formula (4),

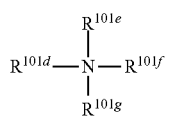
(4)

wherein each of $R^{101d}$, $R^{101e}$, $R^{101f}$, and $R^{101g}$ represents a hydrogen atom, a linear, branched, or cyclic alkyl group, alkenyl group, oxoalkyl group, or oxoalkenyl group having 1 to 12 carbon atoms, an aryl group having 6 to 20 carbon atoms, or an aralkyl group or aryloxoalkyl group having 7 to 12 carbon atoms, in which a part of or all of the hydrogen atoms may be substituted by alkoxy groups, $R^{101d}$ and $R^{101e}$, or $R^{101d}$, $R^{101e}$, and $R^{101f}$ may bond to form a ring, and if they form a ring, $R^{101d}$ and $R^{101e}$, or $R^{101d}$, $R^{101e}$ and $R^{101f}$ represent an alkylene group having 3 to 10 carbon atoms or an aromatic heterocyclic ring having therein the nitrogen atom in the formula.

Such a repeating unit is preferable since it can be easily converted into the repeating unit "a" represented by the general formula (1) by ion exchange.

The polymer compound for a conductive polymer of the present invention has a weight average molecular weight in the range of 1,000 to 500,000, preferably 2,000 to 200,000. When the weight average molecular weight of the polymer compound for a conductive polymer is less than 1,000, it is inferior in heat resistance. In contrast, when the weight average molecular weight of the polymer compound for a conductive polymer is more than 500,000, the viscosity increases, the workability is worsened, and the solubility in water and an organic solvent decreases.

The weight average molecular weight (Mw) is a value in terms of polystyrene determined by gel permeation chromatography (GPC) using water, dimethylformamide (DMF), or tetrahydrofuran (THF) as a solvent.

The polymer compound for a conductive polymer of the present invention as mentioned above is a polymer compound for a conductive polymer having a specific superacidic sulfo group that is soluble in an organic solvent and suitably used for fuel cells or a dopant for conductive materials.

The present invention provides a method for producing such a polymer compound for a conductive polymer of the present invention.

Specifically, the producing method of the present invention is a method for producing a polymer compound for a conductive polymer having a repeating unit "a" represented by the following general formula (1), in which a polymerization reaction is carried out using a monomer having a structure of salt of a sulfonic acid residue and lithium, sodium, potassium, a sulfonium compound, or a nitrogen compound, and after the polymerization reaction, converting the structure of salt of the sulfonic acid residue and the lithium, the sodium, the potassium, the sulfonium compound, or the nitrogen compound into a sulfo group by ion exchange,

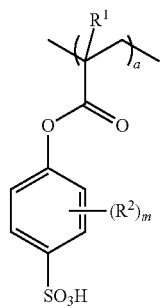

(1)

wherein $R^1$ represents a hydrogen atom or a methyl group, $R^2$ represents a fluorine atom or a trifluoromethyl group, "m" represents an integer of 1 to 4, and "a" satisfies $0<a\leq 1.0$.

Specific examples of the monomer having a structure of salt of sulfonic acid residue and lithium, sodium, potassium, a sulfonium compound, or a nitrogen compound used in the producing method of the present invention, to obtain a repeating unit "a", include as follows.

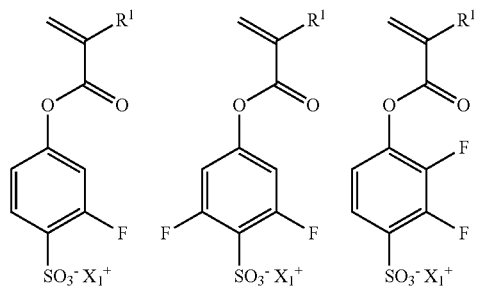

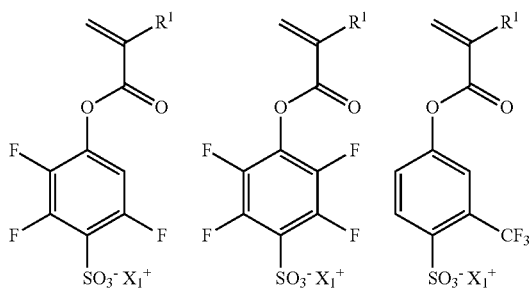

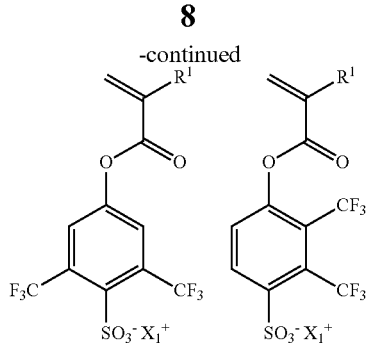

-continued wherein $R^1$ represent the same meanings as before, and $X_1$ represents lithium, sodium, potassium, a sulfonium compound, or a nitrogen compound.

As described above, it is preferable that the polymer compound for a conductive polymer of the present invention have a repeating unit "b" represented by the following general formula (2),

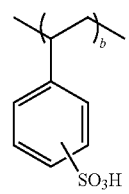

(2)

wherein "b" satisfies $0<b<1.0$.

Specific examples of the monomer to obtain the repeating unit "b" include as follows.

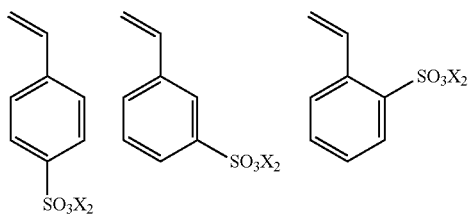

wherein $X_2$ represents a hydrogen atom, lithium, sodium, potassium, a sulfonium compound, or a nitrogen compound.

When $X_1$ and $X_2$ are a nitrogen compound, a compound represented by the following general formula (4) may be exemplified.

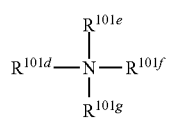

(4)

wherein each of $R^{101d}$, $R^{101e}$, $R^{101f}$, and $R^{101g}$ represents a hydrogen atom, a linear, branched, or cyclic alkyl group, alkenyl group, oxoalkyl group, or oxoalkenyl group having 1 to 12 carbon atoms, an aryl group having 6 to 20 carbon atoms, or an aralkyl group or aryloxoalkyl group having 7 to 12 carbon atoms, in which a part of or all of the hydrogen atoms may be substituted by alkoxy groups, $R^{101d}$ and $R^{101e}$, or $R^{101d}$, $R^{101e}$, and $R^{101f}$ may bond to form a ring, and if they form a ring, $R^{101d}$ and $R^{101e}$, or $R^{101d}$, $R^{101e}$, and $R^{101f}$ represent an alkylene group having 3 to 10 carbon atoms or an aromatic heterocyclic ring having therein the nitrogen atom in the formula.

As described above, "a" satisfies 0<a≤1.0, preferably 0.2≤a≤1.0. When it is in the range of 0<a≤1.0 (i.e., when the repeat unit "a" is contained), the effects of the present invention can be obtained, and when it is in the range of 0.2≤a≤1.0, higher effects can be obtained.

When the repeating unit "b" is contained, 0.3≤b<1.0 is preferred, and 0.3≤b≤0.8 is more preferred from the viewpoints of enhancing conductivity.

The ratio of the repeating unit "a" and the repeating unit "b" is preferably in the range of 0.2≤a≤0.7 and 0.3≤b≤0.8, more preferably 0.3≤a≤0.6 and 0.4≤b≤0.7.

As described above, the polymer compound for a conductive polymer of the present invention may have a repeating unit "c" other than the repeating units "a" and "b". Examples of the repeating unit "c" include styrene series, vinylnaphthalene series, vinylsilane series, acenaphthylene, indene, and vinylcarbazole.

Specific examples of the monomer to obtain the repeating unit "c" include as follows.

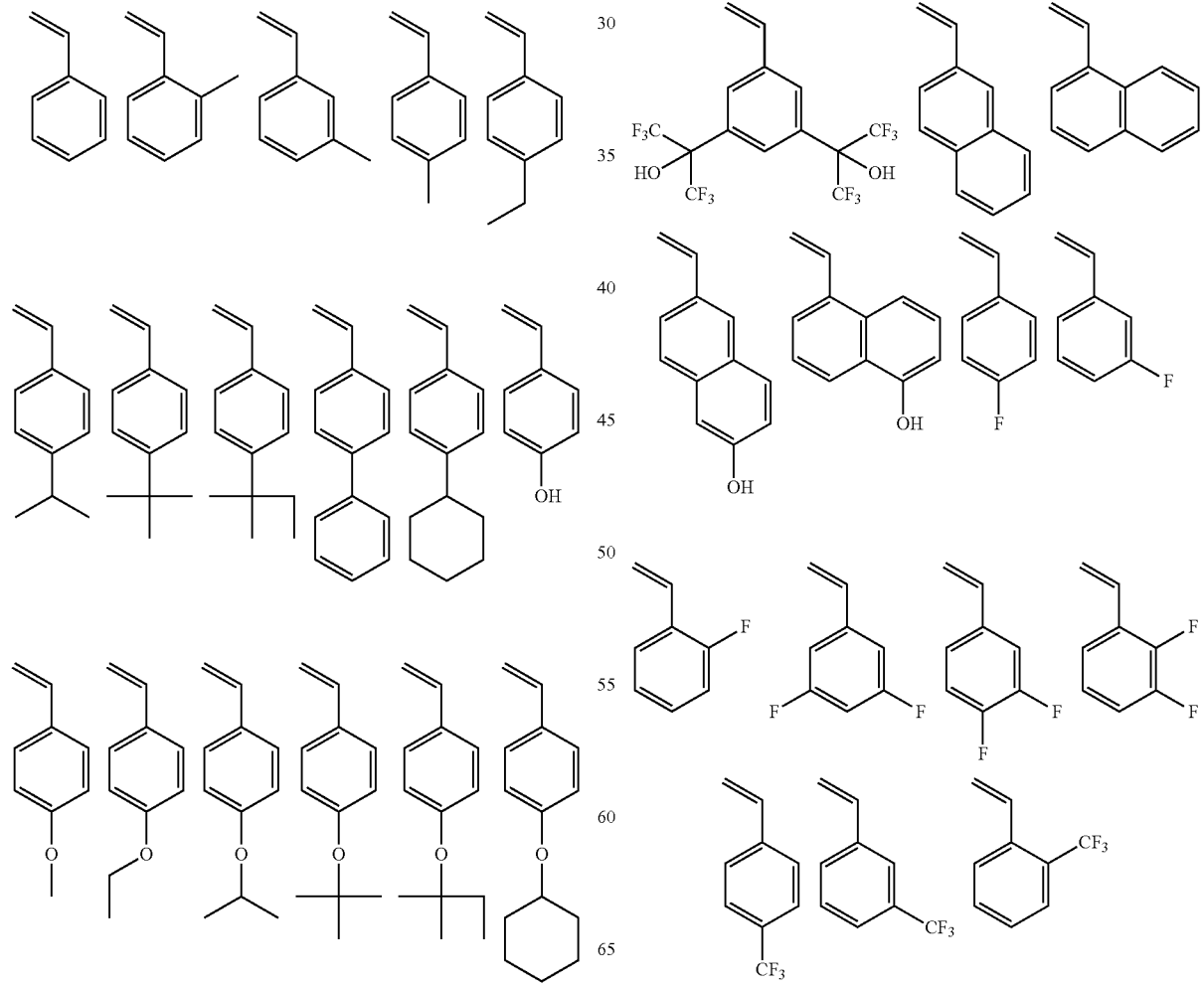

-continued
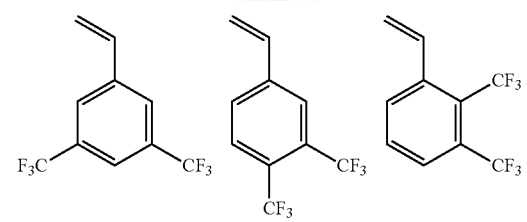
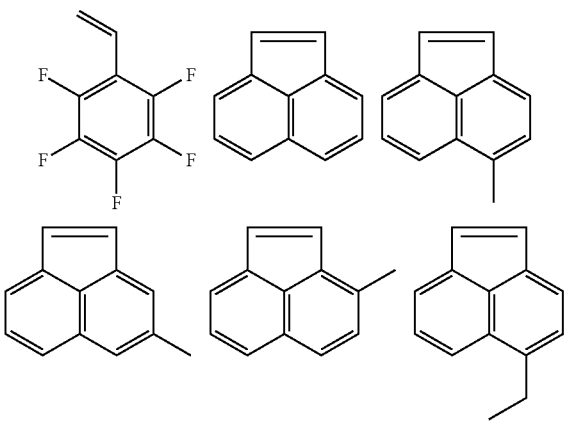
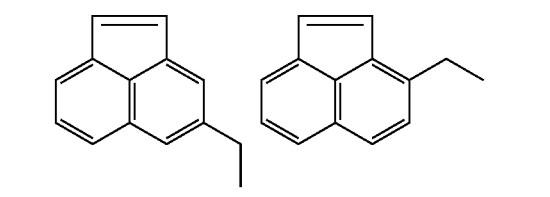
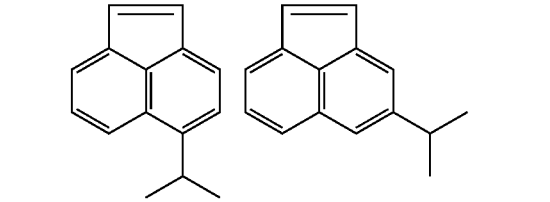
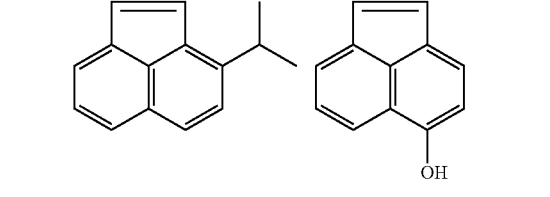
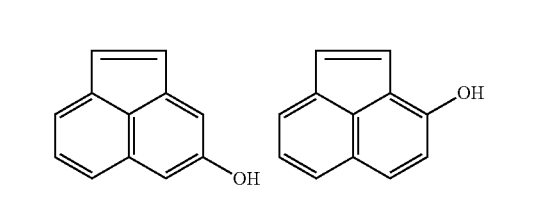
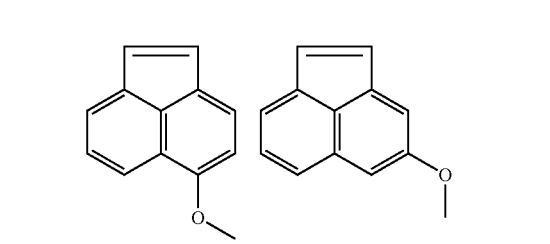
-continued
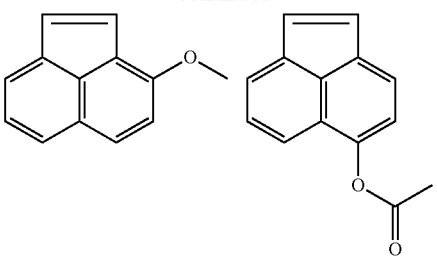
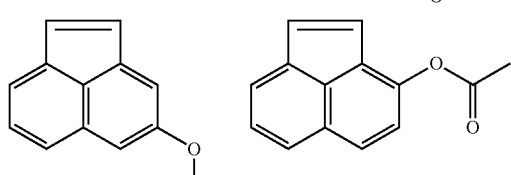
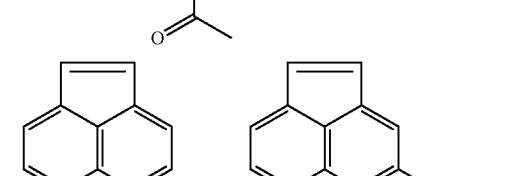
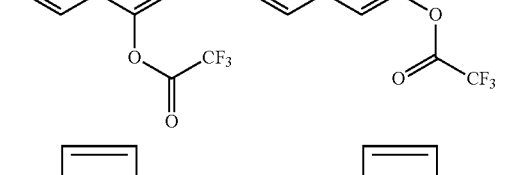
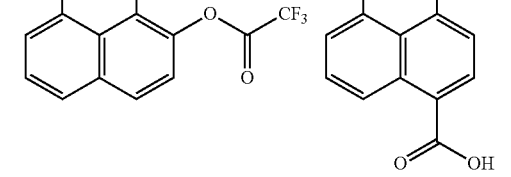
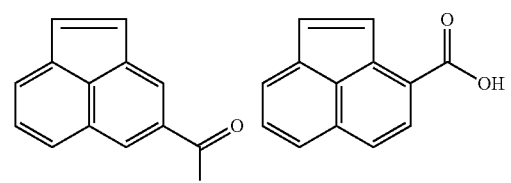
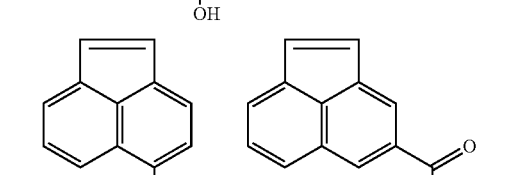
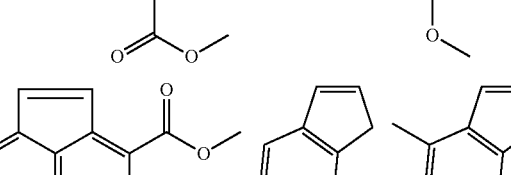
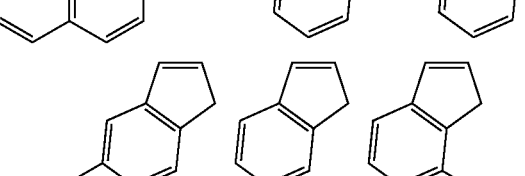
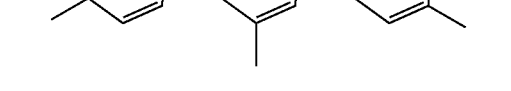

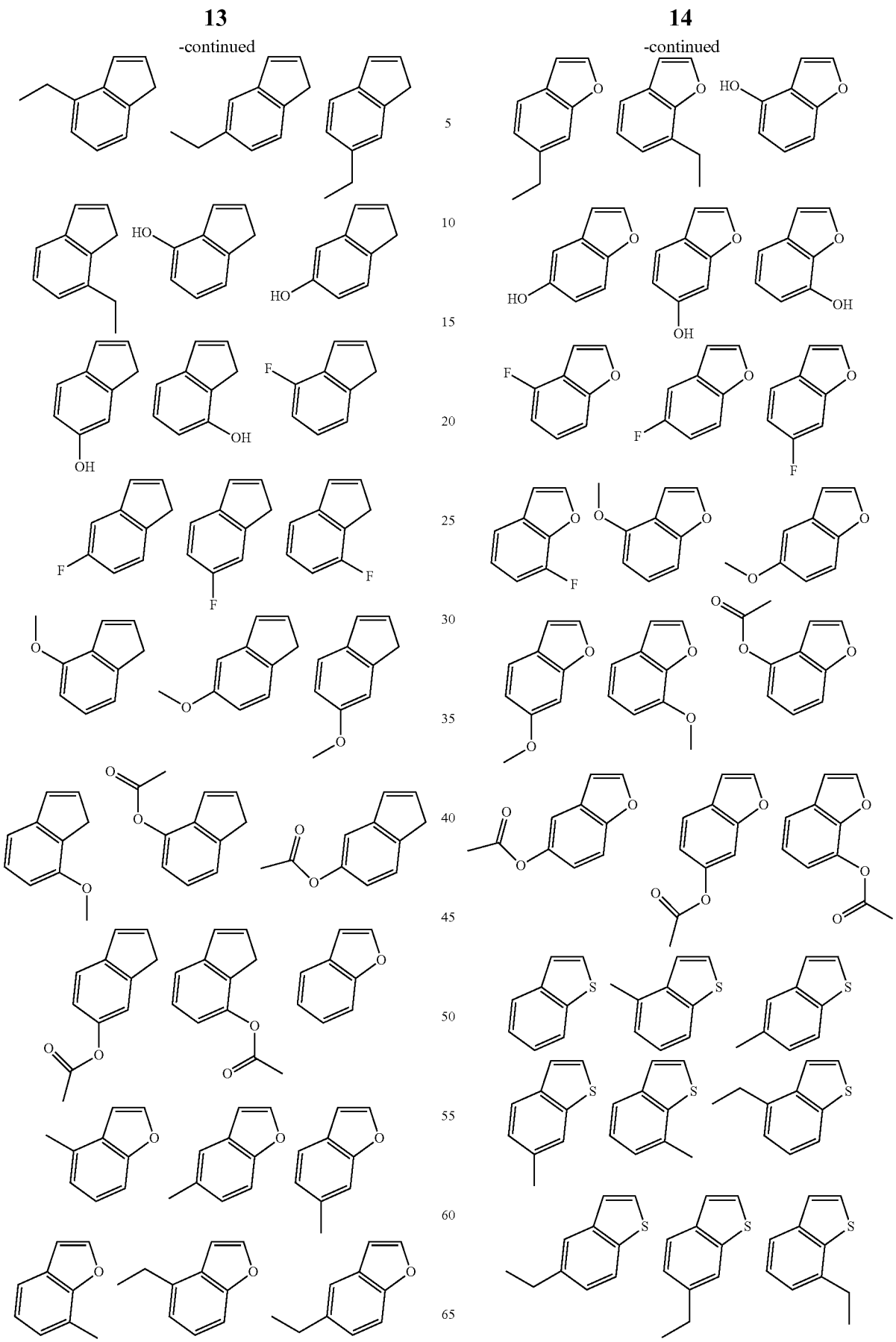

-continued

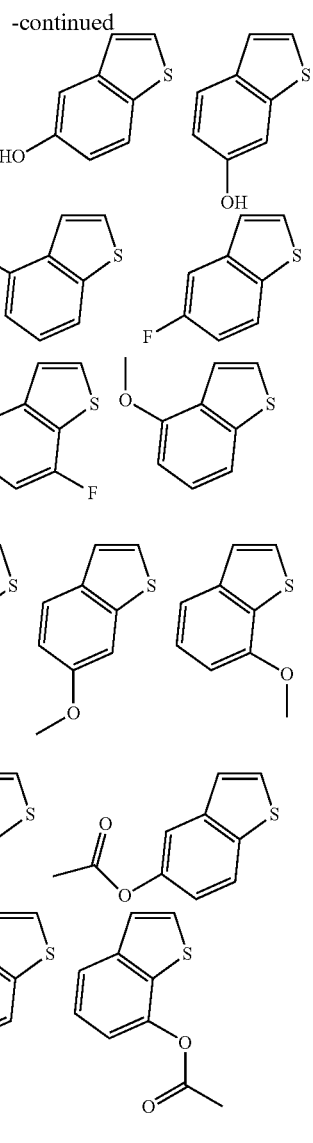

Examples of a method for synthesizing the polymer compound for a conductive polymer of the present invention include a method in which desired monomers among the above monomers are heat-polymerized by adding a radical polymerization initiator in a solvent to obtain a polymer compound, which is a copolymer.

Examples of the solvent used in the polymerization include water, methanol, ethanol, n-propanol, isopropylalcohol, methoxyethanol, ethoxyethanol, n-butanol, ethyleneglycol, propyleneglycol, glycerin, diethyleneglycol, dimethyl sulfoamide, dimethylacetoamide, acetone, dimethyl sulfoxide, N-methyl pyrrolidone, toluene, benzene, tetrahydrofuran, diethyl ether, dioxane, cyclohexane, cyclopentane, methyl ethyl ketone, and γ-butyrolactone.

Examples of the radical polymerization initiator include di-tert-butyl peroxide, dicumyl peroxide, tert-butyl cumyl peroxide, benzoyl peroxide, dilauryl peroxide, cumene hydroperoxide, tert-butyl hydroperoxide, tert-butyl peroxyisobutyrate, potassium persulfate, ammonium persulfate, hydrogen peroxide, 2,2'-azobisisobutyronitrile (AIBN), 2,2'-azobis(2,4-dimethylvaleronitrile), dimethyl 2,2-azobis(2-methylpropionate), lauroyl peroxide, 2,2'-azobis(2-amidinopropane)dihydrochloride, and an alkali metal salt and an ammonium salt of 4,4'-azobis(4-cyanovaleric acid).

The reaction temperature is preferably 50 to 80° C. The reaction time is preferably 2 to 100 hours, more preferably 5 to 20 hours.

In the polymer compound for a conductive polymer of the present invention, monomers to form the repeating unit "a" represented by the general formula (1) may be used alone or in combination with two or more kinds, and methacryl type monomers and styrene type monomers are preferably combined to enhance polymerizability.

In addition, two or more kinds of monomers to form the repeating unit "a" may be random-copolymerized, or each block-copolymerized. When a block-copolymerized polymer (block copolymer) is used for a conductive film, it can be expected to obtain a merit that the conductivity is improved by aggregating repeating unit portions including two or more kinds of repeating units "a" with each other to form a sea-island structure.

Moreover, monomers to form repeating units "a" to "c" may be random-copolymerized, or each block-copolymerized. This case is also expected to obtain a merit that the conductivity is improved due to the block copolymer as explained for the repeating unit "a" above.

When random copolymerization is performed by radical polymerization, the method is generally used in which monomers and a radical polymerization initiator to be used for the copolymerization are mixed and polymerized by heating. In the case that the polymerization is started with a first monomer in the presence of a radical polymerization initiator, and then adding a second monomer thereto later, the resulting polymer has a structure that the first monomer is polymerized at one side of the polymer molecule, and the second monomer is polymerized at the other side. In this case, however, repeating units of the first and second monomers are mixedly present at a middle section, thus it has a different structure from the block copolymer. Living radical polymerization is preferably used to form a block copolymer by radical polymerization.

In living radical polymerization method called Reversible Addition Fragmentation chain Transfer polymerization (RAFT polymerization), polymerization of the first monomer is initiated, and the second monomer is added after consumption of the first monomer. Thus, a block copolymer of the first and second repeating units can be formed. This is because radicals at terminals of polymer are always living. Alternatively, when polymerization of the first monomer is initiated, the second monomer is added after consumption of the first monomer, and a third monomer is then added, a triblock copolymer can be formed.

RAFT polymerization is characterized by forming a narrowly distributed polymer having a narrow molecular weight distribution (degree of distribution). In particular, when monomers are added at once, followed by RAFT polymerization, a polymer having a narrower molecular weight distribution can be formed.

In the polymer compound for a conductive polymer of the present invention, the molecular weight distribution (Mw/Mn) is preferably 1.0 to 2.0, particularly preferably 1.0 to 1.5, that is, narrow distribution. The narrow distribution can prevent unevenness of conductivity of the conductive polymer synthesized by using the polymer compound.

A chain transfer agent is necessary for RAFT polymerization, and specific examples thereof include 2-cyano-2-propyl benzothioate, 4-cyano-4-(phenylcarbonothioylthio) pentanoic acid, 2-cyano-2-propyl dodecyltrithiocarbonate, 4-cyano-4-[(dodecylsulfanylthiocarbonyl)sulfanyl]pentanoic acid, 2-(dodecylthiocarbonothioylthio)-2-methylpropanoic acid, cyanomethyldodecylthiocarbonate, cyanomethylmethyl(phenyl)carbamothioate, bis(thiobenzoyl)disulfide, and bis(dodecylsulfanylthiocarbonyl)disulfide. Among these, 2-cyano-2-propyl benzothioate is particularly preferred.

The ratios of the repeating units "a" to "c" are $0<a\leq1.0$, $0\leq b<1.0$, and $0\leq c<1.0$, preferably $0.1\leq a\leq0.9$, $0.1\leq b\leq0.9$, and more preferably $0.2\leq a\leq0.8$, $0.2\leq b\leq0.8$, and $0\leq c\leq0.5$.

Also, $a+b+c=1$ is preferred.

In the method for producing the polymer compound for a conductive polymer of the present invention, monomers are polymerized as described above, and a structure of salt of a sulfonic acid residue and lithium, sodium, potassium, a sulfonium compound, or a nitrogen compound is converted into a sulfo group by ion exchange.

The ion exchange may be performed, for example, using an ion exchange resin.

According to this method, the polymer compound for a conductive polymer having the repeating unit "a" represented by the general formula (1) can be easily produced.

As described above, the polymer compound for a conductive polymer of the present invention is a polymer compound for a conductive polymer having a specific superacidic sulfo group that is soluble in an organic solvent and suitably used for fuel cells or a dopant for conductive materials.

When such a polymer compound for a conductive polymer is used for fuel cells, a highly dielectric material for fuel cells can be formed. When such a polymer compound for a conductive polymer is used as a dopant for a conjugated double bond polymer, a highly transparent, highly conductive, and highly durable conductive film can be formed. Since the polymer compound for a conductive polymer has excellent solubility in an organic solvent, using the polymer compound as a conductive film for an organic EL illumination can prevent deterioration of an organic EL device.

According to the producing method of the present invention, such a polymer compound for a conductive polymer of the present invention can be easily produced.

EXAMPLES

Hereinafter, the present invention will be specifically described with reference to Examples, but the present invention is not limited to these Examples.

Monomers used in syntheses of Examples are as follows.

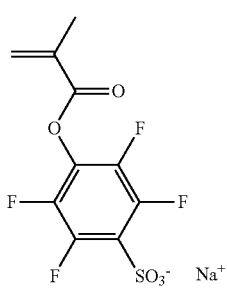

Monomer 1

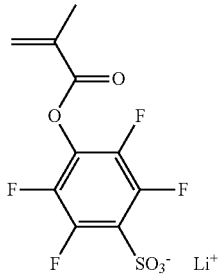

Monomer 2

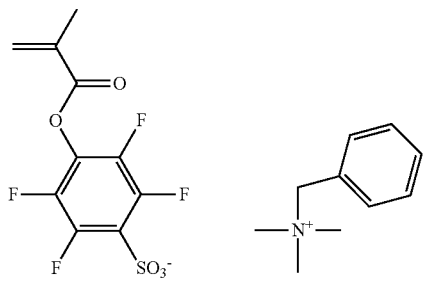

Monomer 3

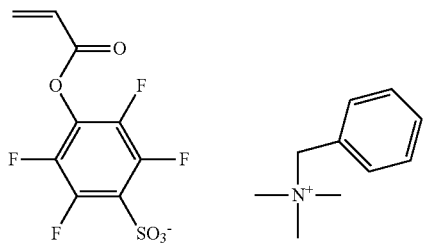

Monomer 4

Monomers

Monomer 1: sodium 2,3,5,6-tetrafluoro-4-methacryloyloxy-1-sulfonate

Monomer 2: lithium 2,3,5,6-tetrafluoro-4-methacryloyloxy-1-sulfonate

Monomer 3: benzyltrimethylammonium 2,3,5,6-tetrafluoro-4-methacryloyloxy-1-sulfonate Monomer 4: benzyltrimethylammonium 2,3,5,6-tetrafluoro-4-acryloyloxy-1-sulfonate Example 1

33.6 g of Monomer 1 and 5.13 g of dimethyl 2,2'-azobis(isobutyrate) were dissolved in 112.5 g of methanol, and the solution was added dropwise to 37.5 g of methanol stirred at 64° C. under nitrogen atmosphere, over 4 hours. The mixture was then stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain a white polymer.

The white polymer was dissolved in 912 g of pure water, and the sodium salt was converted into a sulfo group using an ion exchange resin. The obtained polymer was measured by $^{19}$F-NMR, $^{1}$H-NMR, and GPC, to obtain the following analytical results.

Weight average molecular weight (Mw): 46,000
Molecular weight distribution (Mw/Mn): 1.66
This polymer compound is designated as (Polymer 1).

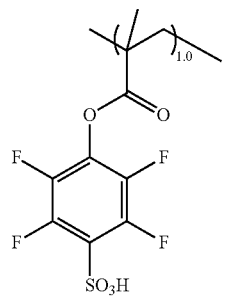

Polymer 1

Example 2

32.0 g of Monomer 2 and 5.13 g of dimethyl 2,2'-azobis (isobutyrate) were dissolved in 112.5 g of methanol, and the solution was added dropwise to 37.5 g of methanol stirred at 64° C. under nitrogen atmosphere, over 4 hours. The mixture was then stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain a white polymer.

The white polymer was dissolved in 912 g of pure water, and the lithium salt was converted into a sulfo group using an ion exchange resin. The obtained polymer was measured by $^{19}$F-NMR, $^1$H-NMR, and GPC, to obtain the following analytical results.
Weight average molecular weight (Mw): 48,000
Molecular weight distribution (Mw/Mn): 1.71
This polymer compound is designated as (Polymer 2).

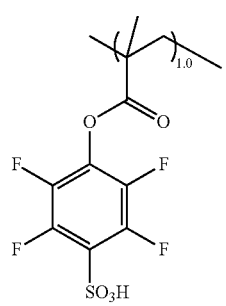

Polymer 2

Example 3

46.3 g of Monomer 3 and 5.13 g of dimethyl 2,2'-azobis (isobutyrate) were dissolved in 112.5 g of methanol, and the solution was added dropwise to 37.5 g of methanol stirred at 64° C. under nitrogen atmosphere, over 4 hours. The mixture was then stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain a white polymer.

The white polymer was dissolved in 912 g of pure water, and the benzyltrimethylammonium salt was converted into a sulfo group using an ion exchange resin. The obtained polymer was measured by $^{19}$F-NMR, $^1$H-NMR, and GPC, to obtain the following analytical results.
Weight average molecular weight (Mw): 42,000
Molecular weight distribution (Mw/Mn): 1.72
This polymer compound is designated as (Polymer 3).

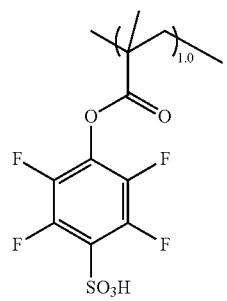

Polymer 3

Example 4

44.9 g of Monomer 4 and 2.82 g of dimethyl 2,2'-azobis (isobutyrate) were dissolved in 112.5 g of methanol, and the solution was added dropwise to 37.5 g of methanol stirred at 64° C. under nitrogen atmosphere, over 4 hours. The mixture was then stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain a white polymer.

The white polymer was dissolved in 421 g of methanol, and the benzyltrimethylammonium salt was converted into a sulfo group using an ion exchange resin. The obtained polymer was measured by $^{19}$F-NMR, $^1$H-NMR, and GPC, to obtain the following analytical results.
Weight average molecular weight (Mw): 53,000
Molecular weight distribution (Mw/Mn): 1.88
This polymer compound is designated as (Polymer 4).

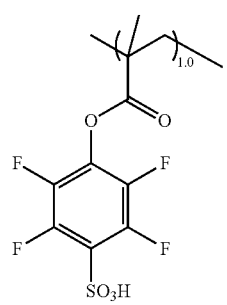

Polymer 4

Example 5

9.6 g of Monomer 2, 13.3 g of lithium styrenesulfonate, and 4.19 g of dimethyl 2,2'-azobis(isobutyrate) were dissolved in 112.5 g of methanol, and the solution was added dropwise to 37.5 g of methanol stirred at 64° C. under nitrogen atmosphere, over 4 hours. The mixture was then stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain a white polymer.

The white polymer was dissolved in 396 g of methanol, and the lithium salt was converted into a sulfo group using an ion exchange resin. The obtained polymer was measured by $^{19}$F-NMR, $^{1}$H-NMR, and GPC, to obtain the following analytical results.

Copolymer Composition Ratio (Molar Ratio)
Monomer 2:styrenesulfonic acid=3:7
Weight average molecular weight (Mw): 39,700
Molecular weight distribution (Mw/Mn): 1.83
This polymer compound is designated as (Polymer 5).

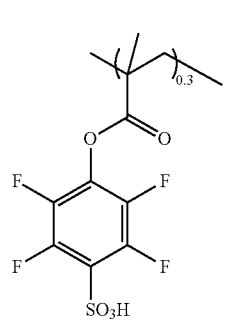

Polymer 5

Example 6

A diblock copolymer was synthesized by RAFT polymerization described below.

0.42 g of 2-cyano-2-propylbenzodithioate and 0.10 g of 2,2'-azobisisobutyronitrile were dissolved in 37.5 g of methanol under nitrogen atmosphere, and the solution was stirred at 64° C. for 3 hours under nitrogen atmosphere. A solution obtained by dissolving 9.5 g of lithium styrenesulfonate in 64.3 g of methanol was added dropwise to the solution, over 2 hours. A solution obtained by dissolving 16.0 g of Monomer 2 in 48.2 g of methanol was added dropwise to the solution, over 2 hours. After completion of the dropwise addition, the mixture was stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain a red polymer.

The red polymer was dissolved in 306 g of methanol, and the lithium salt was converted into a sulfo group using an ion exchange resin. The obtained polymer was measured by $^{19}$F-NMR, $^{1}$H-NMR, and GPC, to obtain the following analytical results.

Copolymer Composition Ratio (Molar Ratio)
Monomer 2:styrenesulfonic acid=1:1
Weight average molecular weight (Mw): 42,000
Molecular weight distribution (Mw/Mn): 1.37
This polymer compound is designated as (Polymer 6).

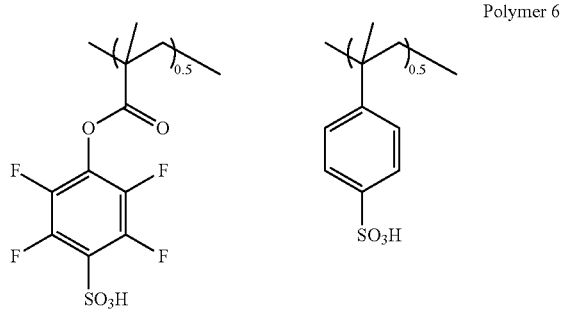

Polymer 6

Example 7

A triblock copolymer was synthesized by RAFT polymerization described below.

0.42 g of 2-cyano-2-propylbenzodithioate and 0.10 g of 2,2'-azobisisobutyronitrile were dissolved in 37.5 g of methanol under nitrogen atmosphere, and the solution was stirred at 64° C. for 3 hours under nitrogen atmosphere. A solution obtained by dissolving 4.8 g of lithium styrenesulfonate in 32.2 g of methanol was added dropwise to the solution, over 2 hours. A solution obtained by dissolving 16.0 g of Monomer 2 in 48.2 g of methanol was added dropwise to the solution, over 2 hours. A solution obtained by dissolving 4.8 g of lithium styrenesulfonate in 32.2 g of methanol was added dropwise to the solution, over 2 hours. After completion of the dropwise addition, the mixture was stirred at 64° C. for 4 hours. After cooling to room temperature, the mixture was added dropwise to 1,000 g of ethyl acetate under vigorous stirring. The resulting solid was collected by filtration, and dried under vacuum at 50° C. for 15 hours to obtain a red polymer.

The red polymer was dissolved in 306 g of methanol, and the lithium salt was converted into a sulfo group using an ion exchange resin. The obtained polymer was measured by $^{19}$F-NMR, $^{1}$H-NMR, and GPC, to obtain the following analytical results.

Copolymer Composition Ratio (Molar Ratio)
Monomer 2:styrenesulfonic acid=1:1
Weight average molecular weight (Mw): 36,000
Molecular weight distribution (Mw/Mn): 1.46
This polymer compound is designated as (Polymer 7).

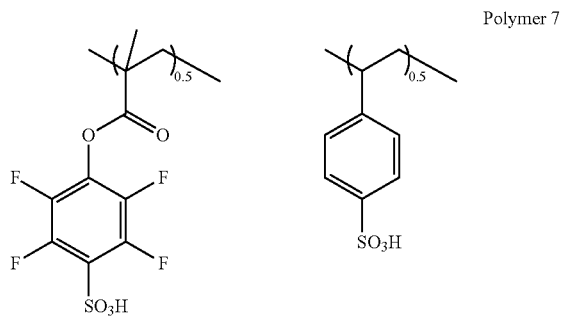

Polymer 7

Polymers 1 to 7 synthesized as described above were soluble in water, methanol, ethanol, isopropyl alcohol, propylene glycol monomethyl ether, tetrahydrofuran, and dimethyl formamide.

According to the producing method of the present invention, the polymer compound for a conductive polymer of the present invention that is soluble in organic solvent and has a specific superacidic sulfo group can be easily produced.

The present invention is not restricted to the embodiments shown above. The embodiments are merely examples, and any examples that have substantially the same configuration and demonstrate the same effects as the technical concept described in claims of the present invention are included in the technical scope of the present invention.

What is claimed is:

1. A dopant polymer for a conductive polymer, having
   (i) one or more repeating units "a" represented by the following general formula (1),

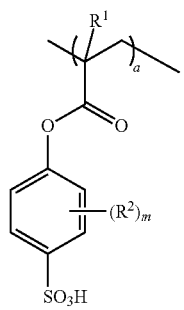

(1)

wherein $R^1$ represents a hydrogen atom or a methyl group, $R^2$ represents a fluorine atom or a trifluoromethyl group, "m" represents an integer of 2 to 4, and a number of "a" repeating units as a proportion of a total number of all repeating units in the dopant polymer satisfies $0<a<1.0$; and (ii) at least one repeating unit "b" represented by the following general formula (2),

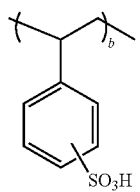

(2)

wherein a number of "b" repeating units as a proportion of the total number of all repeating units in the dopant polymer satisfies $0<b<1.0$;

wherein the dopant polymer for the conductive polymer has a weight average molecular weight in the range of 1,000 to 500,000.

2. The dopant polymer for a conductive polymer according to claim 1, the dopant polymer being synthesized by ion exchanging of a lithium salt, a sodium salt, a potassium salt, a sulfonium compound salt, or a nitrogen compound salt of sulfonic acid residue, wherein the lithium salt, the sodium salt, the potassium salt, the sulfonium compound salt, or the nitrogen compound salt of the sulfonic acid residue is composed of a repeating unit represented by the following general formula (3),

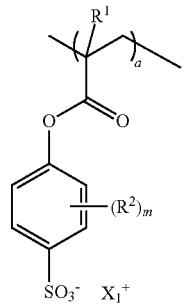

(3)

wherein $R^1$, $R^2$, "m", and "a" represent the same meanings as before, and $X_1$ represents lithium, sodium, potassium, a sulfonium compound, or a nitrogen compound represented by the following general formula (4),

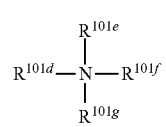

(4)

wherein each of $R^{101d}$, $R^{101e}$, $R^{101f}$, and $R^{101g}$ represents a hydrogen atom, a linear, branched, or cyclic alkyl group, alkenyl group, oxoalkyl group, or oxoalkenyl group having 1 to 12 carbon atoms, an aryl group having 6 to 20 carbon atoms, or an aralkyl group or aryloxoalkyl group having 7 to 12 carbon atoms, in which a part of or all of the hydrogen atoms may be substituted by alkoxy groups, $R^{101d}$ and $R^{101e}$, or $R^{101d}$, $R^{101e}$, and $R^{101f}$ may bond to form a ring, and if they form a ring, $R^{101d}$ and $R^{101e}$, or $R^{101d}$, $R^{101e}$, and $R^{101f}$ represent an alkylene group having 3 to 10 carbon atoms or an aromatic heterocyclic ring having therein the nitrogen atom in the formula.

3. The dopant polymer for a conductive polymer according to claim 1, wherein the number of "a" repeating units satisfies $0.2 \leq a \leq 0.7$, and the number of "b" repeating units satisfies $0.3 \leq b \leq 0.8$.

4. A method for producing the dopant polymer for a conductive polymer according to claim 1, comprising:

carrying out a polymerization reaction using a plurality of monomers, each monomer having a structure of salt of a sulfonic acid residue and lithium, sodium, potassium, a sulfonium compound, or a nitrogen compound, and after the polymerization reaction, converting the structure of the salt of the sulfonic acid residue and the lithium, the sodium, the potassium, the sulfonium compound, or the nitrogen compound into a sulfo group by ion exchange to produce the dopant polymer.

5. The dopant polymer for a conductive polymer according to claim 3, the dopant polymer being synthesized by ion exchanging of a lithium salt, a sodium salt, a potassium salt, a sulfonium compound salt, or a nitrogen compound salt of sulfonic acid residue, wherein the lithium salt, the sodium salt, the potassium salt, the sulfonium compound salt, or the nitrogen compound salt of the sulfonic acid residue is composed of a repeating unit represented by the following general formula (3),

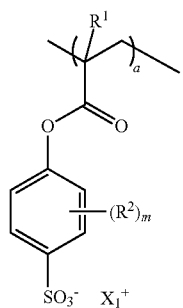

(3)

wherein $R^1$, $R^2$, "m", and "a" represent the same meanings as before, and $X_1$ represents lithium, sodium, potassium, a sulfonium compound, or a nitrogen compound represented by the following general formula (4),

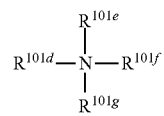

(4)

wherein each of $R^{101d}$, $R^{101e}$, $R^{101f}$, and $R^{101g}$ represents a hydrogen atom, a linear, branched, or cyclic alkyl group, alkenyl group, oxoalkyl group, or oxoalkenyl group having 1 to 12 carbon atoms, an aryl group having 6 to 20 carbon atoms, or an aralkyl group or aryloxoalkyl group having 7 to 12 carbon atoms, in which a part of or all of the hydrogen atoms may be substituted by alkoxy groups, $R^{101d}$ and $R^{101e}$, or $R^{101d}$, $R^{101e}$, and $R^{101f}$ may bond to form a ring, and if they form a ring, $R^{101d}$ and $R^{101e}$, or $R^{101d}$, $R^{101e}$, and $R^{101f}$ represent an alkylene group having 3 to 10 carbon atoms or an aromatic heterocyclic ring having therein the nitrogen atom in the formula.

\* \* \* \* \*